United States Patent [19]
Miyoshi

[11] Patent Number: 5,493,498
[45] Date of Patent: Feb. 20, 1996

[54] POSITIONING APPARATUS

[75] Inventor: Katsutoshi Miyoshi, Fukuoka, Japan

[73] Assignee: Matsushita Electric Industrial Co., Ltd., Kadoma, Japan

[21] Appl. No.: 200,713

[22] Filed: Feb. 23, 1994

[30] Foreign Application Priority Data

Feb. 23, 1993 [JP] Japan .................................. 5-056319

[51] Int. Cl.⁶ .................................................. G06F 165/00
[52] U.S. Cl. ........................... 364/449; 340/990; 340/995
[58] Field of Search ..................................... 364/443, 444, 364/449; 73/178 R; 340/988, 990, 995, 693

[56] References Cited

U.S. PATENT DOCUMENTS

| | | | |
|---|---|---|---|
| 4,535,334 | 8/1985 | Tagami et al. | 340/995 |
| 4,891,760 | 1/1990 | Kashiwazaki et al. | 340/995 |
| 4,903,211 | 2/1990 | Ando | 340/995 |
| 5,296,855 | 3/1994 | Matsuzaki et al. | 340/988 |
| 5,331,563 | 7/1994 | Masumoto et al. | 340/995 |
| 5,369,588 | 11/1994 | Hayami et al. | 340/995 |

Primary Examiner—Gary Chin
Attorney, Agent, or Firm—Cushman, Darby & Cushman

[57] ABSTRACT

A positioning apparatus in a vehicle for detecting the vehicle's position has a position search unit for computing a present position of the vehicle, and for outputting a control signal to shut off the power-source for the positioning apparatus when the vehicle is in a stopping state for a predetermined time-interval.

6 Claims, 9 Drawing Sheets

POSITIONING APPARATUS

FIELD OF THE INVENTION AND RELATED ART STATEMENT

1. Field of the Invention

The present invention relates to a positioning apparatus for determining the position of a vehicle, such as an automobile, more particularly, to a positioning apparatus having a global positioning system (hereinafter abbreviated as GPS) which detects the position of the vehicle by using radio waves from artificial earth satellites.

2. Background of the Invention

A conventional positioning apparatus have an automatic power-source shutoff circuit which was designed to turn off a switch in a power-source line when a keyboard of the conventional positioning apparatus is not operated for a predetermined time-interval by a driver, etc. of a vehicle. The automatic power-source shutoff circuit is provided to save electric energy of a power-source, namely, a battery of the vehicle when the positioning apparatus is not used by the driver, etc.

However, it is difficult for the driver to operate the keyboard of the positioning apparatus while driving. Therefore, the positioning apparatus is turned off by means of the conventional automatic power-source shutoff circuit despite the face that the driver is watching a display of the positioning apparatus. Although the positioning apparatus is useful as a navigation system during a driving state, the conventional positioning apparatus was not sufficiently effective to use while driving.

If the conventional positioning apparatus is used, and if the automatic power-source shutoff circuit is not provided in the positioning apparatus, the electric energy of the battery may be wasted should the driver inadvertently fail to turn off the positioning apparatus. The reason for this is that the power-source for the positioning apparatus loaded in an automobile is supplied from a cigarette lighter socket, which is not connected to the ignition switch of the automobile.

OBJECT AND SUMMARY OF THE INVENTION

An object of the present invention is to provide a positioning apparatus which can be used as a navigation system during driving, and which is designed to save the energy of the power-source when a driver forgets to turn off for the positioning apparatus.

In order to achieve the above-mentioned object, a positioning apparatus in accordance with the present invention comprises:

a position detecting means for detecting a present position of a vehicle having the positioning apparatus, a data input means for operating the positioning apparatus, a power-source supply means for controlling a power-source for the positioning apparatus, a display means for indicating position data of the vehicle, and a position search means which is provided for computing the present position of the vehicle and for outputting the control signal to shut off the power-source when the vehicle has been stopped for a predetermined time-interval.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

FIRST EMBODIMENT

Figure 1:
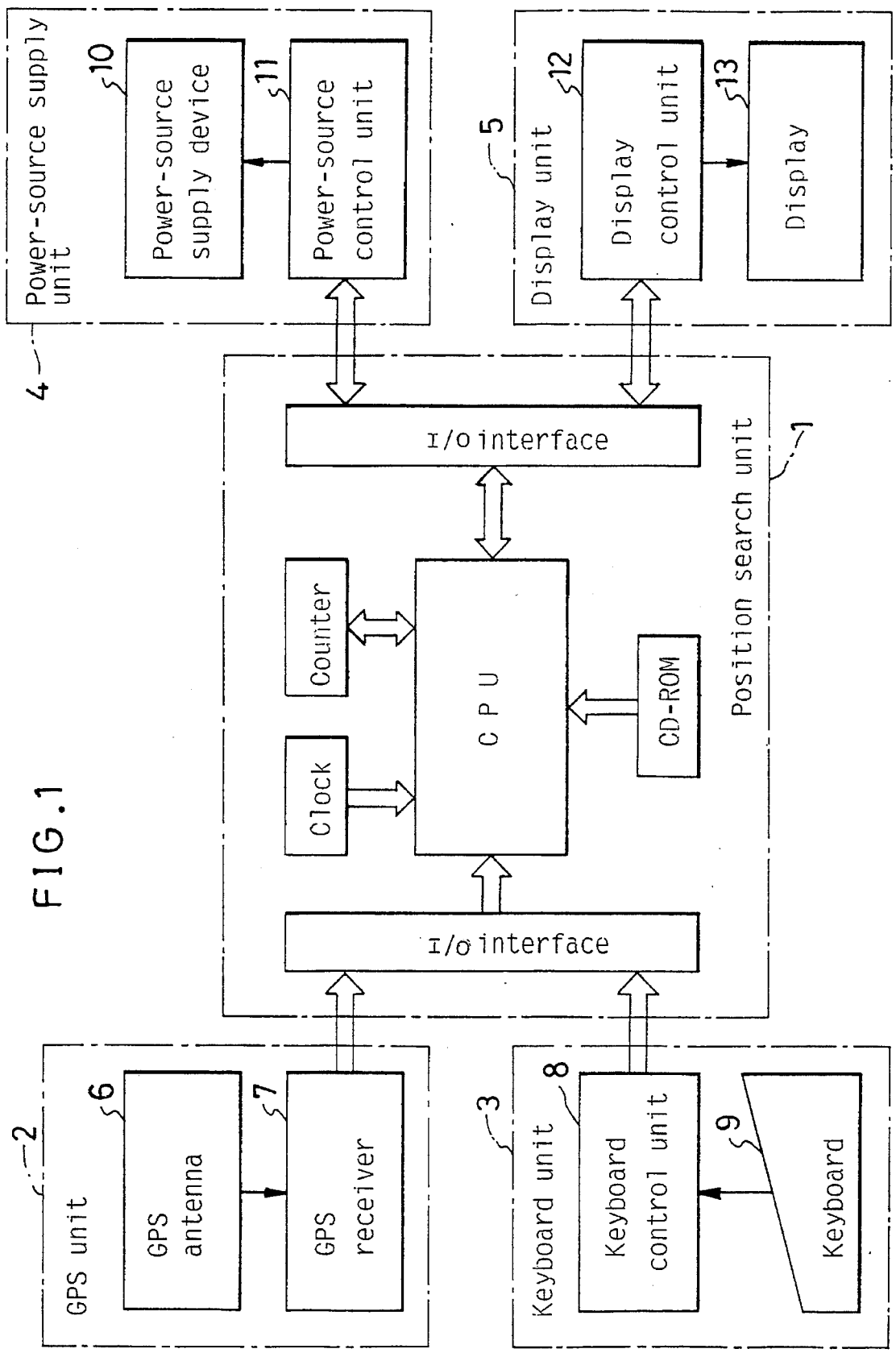
FIG. 1 is a block diagram showing a first embodiment of a positioning apparatus in accordance with the present invention.
Figure 2:
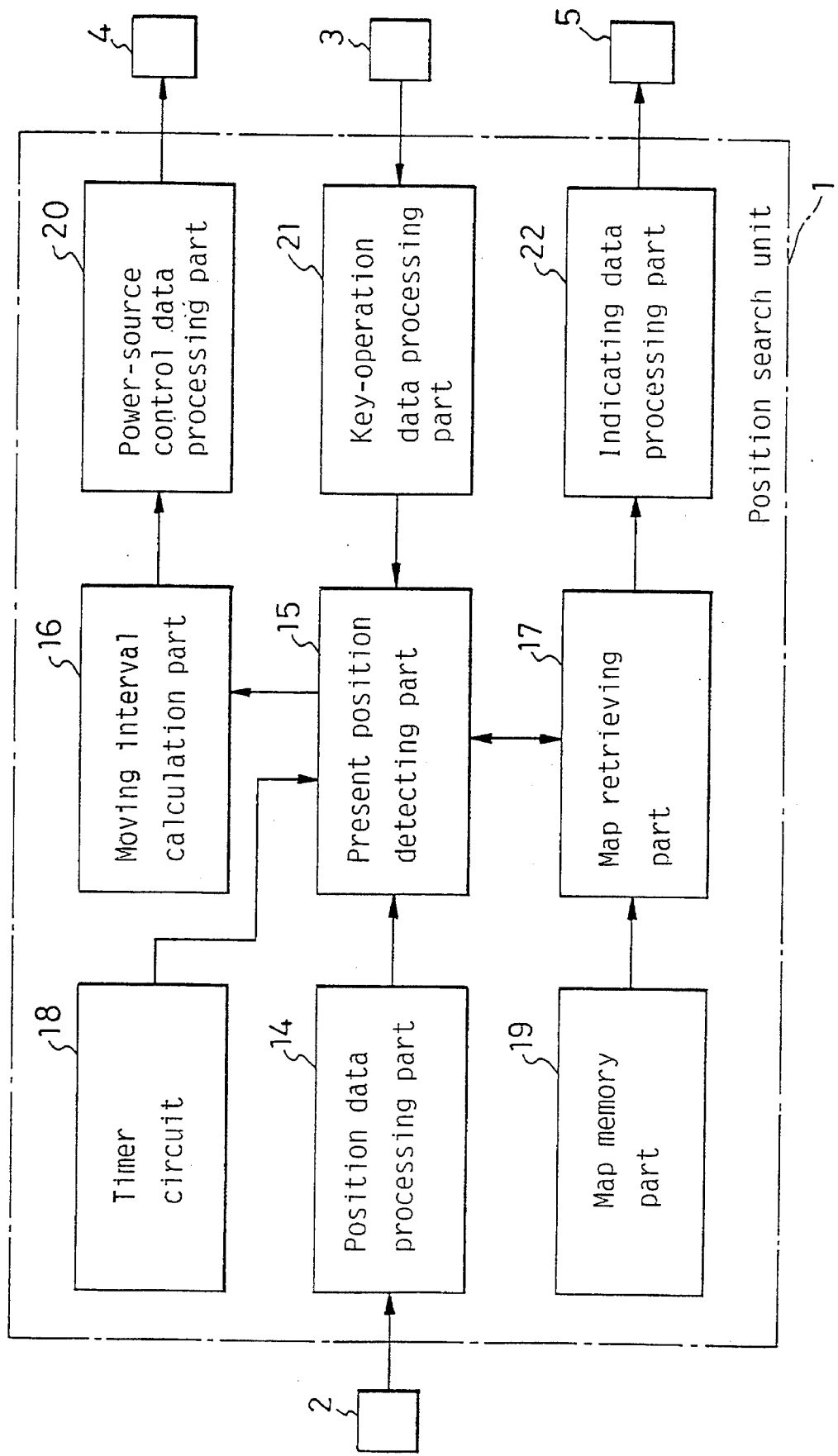
FIG. 2 is a block diagram showing a position search unit of the positioning apparatus of FIG. 1.
Figure 3:
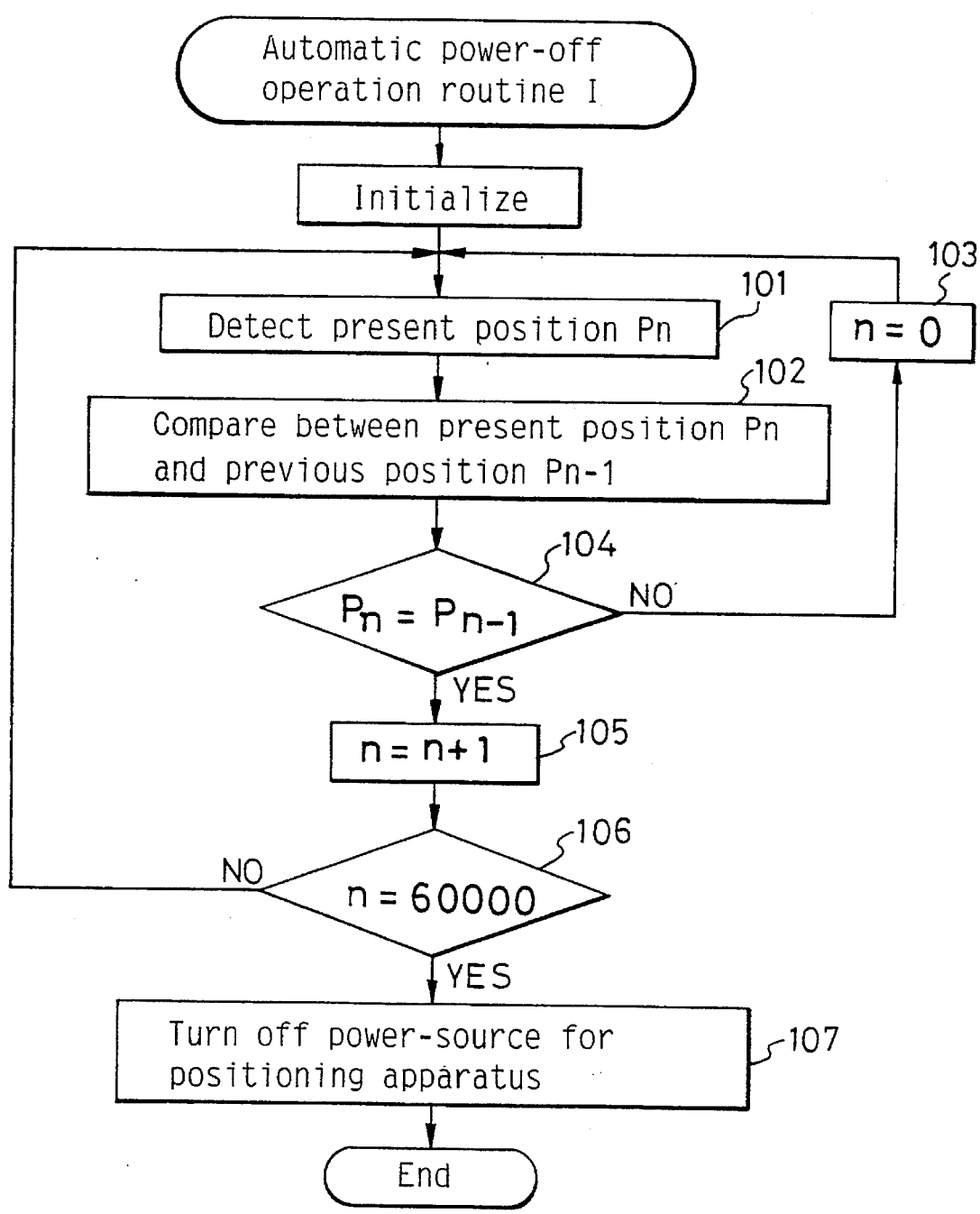
FIG. 3 is a flowchart showing the operation of the positioning apparatus of FIG. 1.

Hereafter, a first embodiment of a positioning apparatus in accordance with the present invention is elucidated with reference to FIG. 1 through FIG. 3.

FIG. 1 shows a a block diagram of a first embodiment of the positioning apparatus, FIG. 2 shows a block diagram of a position search unit 1 in the positioning apparatus of FIG. 1, and FIG. 3 shows a flowchart of the operation of the positioning apparatus of the first embodiment.

In FIG. 1, the positioning apparatus comprises a GPS (global positioning system) unit 2 as a position detecting means for receiving and analyzing radio waves from artificial earth satellites. A keyboard unit 3 is provided as a data input means for operating the positioning apparatus. A power-source supply unit 4 supplies power for the positioning apparatus. A display unit 5 provides information about position data and relevant information. A position search unit 1 computes the present position of the vehicle having the positioning apparatus. The position search unit 1 also controls the power-source supply to the positioning apparatus.

The GPS unit 2 has a GPS antenna 6 and a GPS receiver 7 which is connected to the position search unit 1 so as to feed position data of the GPS unit 2. The keyboard unit 3 has a keyboard 9 and a keyboard control unit 8 for connecting information from the keyboard 9 to the position search unit 1. The power-source supply unit 4 has a power-source supply device 10 and a power-source control unit 11 which is provided for controlling the power-source supply for the positioning apparatus. The display unit 5 has a display 13 and a display control unit 12 which is connected to the position search unit 1 so as to indicate position data, etc. The position search unit 1 computes a present position of the vehicle, in which the positioning apparatus is loaded, by using the position data from the artificial earth satellites, and shuts off the power-source supply to the positioning apparatus when the position search unit 1 detects a non-use state of the positioning apparatus.

FIG. 2 is a block diagram showing the abovementioned position search unit 1 in the positioning apparatus of the first embodiment. As shown in FIG. 2, the position search unit 1 includes a position data processing part 14 for computing a latitude and a longitude from detected position data of the GPS unit 2. A present position detecting part 15 is provided in the position search unit 1 for detecting a present position of the vehicle from the computed position data of the position data processing part 14.

The data about the detected present position and map information corresponding to the detected present position are fed to an indicating data processing part 22 through a map retrieving part 17 connected to a map memory part 19. A moving interval calculation part 16 is provided for calculating a moving interval of the vehicle by using the data about the detected present position and the stored previous position of the vehicle.

Furthermore, the position search unit 1 provides a power-source control data processing part 20 for outputting control signals to the power-source supply unit 4, a key-operation data processing part 21 for communicating control signals from the keyboard unit 3 to the position search unit 1, and a timer circuit 18 for measuring the operation time of the position search unit 1. In an actual example, the position search unit 1 is constituted substantially by an A/D converter, an arithmetic unit, such as a logical circuit having a CPU, a CD-ROM and so on.

The position data processing part 14 computes a position data by using the analyzed radio waves of the GPS unit 2. The present position detecting part 15 computes the present position of the vehicle from the position data which is computed by the position data processing part 14. The moving interval calculation part 16 computes a moving interval between the detected present position and the stored previous position just before this detecting time.

The above-mentioned position search unit 1 of the first embodiment performs the following automatic power-source shutoff operation (hereinafter abbreviated as automatic power-off operation) by using the position data detected in the position search unit 1.

FIG. 3 shows a flowchart of the automatic power-off operation of the above-mentioned positioning apparatus. The position search unit 1 of the positioning apparatus periodically performs the following automatic power-off operation routine every 20 msec in this embodiment.

In step 101 of FIG. 3, the present position Pn of the vehicle is detected by using position data of the position data processing part 14. In step 102, the detected present position Pn is compared with the previous position Pn−1 just before this routine. In step 104, it is judged whether the detected present position Pn is almost the same as the previous position Pn−1 or not. Because the computed vehicle position includes some error owing to measurement etc., the position data to be compared is designed to have some allowable margin.

When the position search unit 1 in step 104 decides "Yes", that is, the vehicle is in a stopping state, a time counter of the timer circuit 18 adds "1" to the stored ordinal number n in step 105. Next, in step 106, it is judged whether the new ordinal number n comes to the predetermined ordinal number, such as 60000 (corresponding to 20 minutes), or not. When the new ordinal number n comes to 60000, a shutoff order signal for shutting off the power-source for each unit in the positioning apparatus is fed in step 107 to the power-source supply unit 4, and then the automatic power-off operation routine has been finished.

In step 104, when the position search unit 1 decides "NO", that is, the vehicle is in a moving state, the counted ordinal number n is reset at "0" in step 103, and the sequence returns to step 101.

In step 106, when the position search unit 1 decides "NO", that is, the stoppage time of the vehicle does not reach the predetermined time-interval, such as 20 minutes, the sequence returns to step 101.

As mentioned above, the automatic power-off operation routine is performed by the position search unit 1 every 20 msec during the ON state of the positioning apparatus, and the power-source supply to the positioning apparatus is shut off when the vehicle is in the stopping state for the predetermined time-interval (20 minutes), and then the automatic power-off operation routine is finished.

The power-source for the positioning apparatus of the first embodiment can be controlled to be supplied or to be shut off by operating keyboard unit 3 as a matter of course.

According to the first embodiment of the present invention; when the vehicle provided with the positioning apparatus is moving, that is, the detected present position of the vehicle is changing, the power is provided to any unit of the positioning apparatus as long as the power-source is not shut off by a key-operation. When the vehicle has been stopped for a predetermined time-interval, the power supplied to the positioning apparatus is stopped.

Apart from the above-mentioned embodiment wherein the power-source supply unit 4 controls the power-source for each unit of the positioning apparatus, a modified embodiment may be such that a power-source supply unit controls a power-source for only the display unit. Because the display unit of the positioning apparatus consumes much more electricity than the other units, the positioning apparatus of this modified embodiment can also save electrical energy.

SECOND EMBODIMENT

Figure 4:
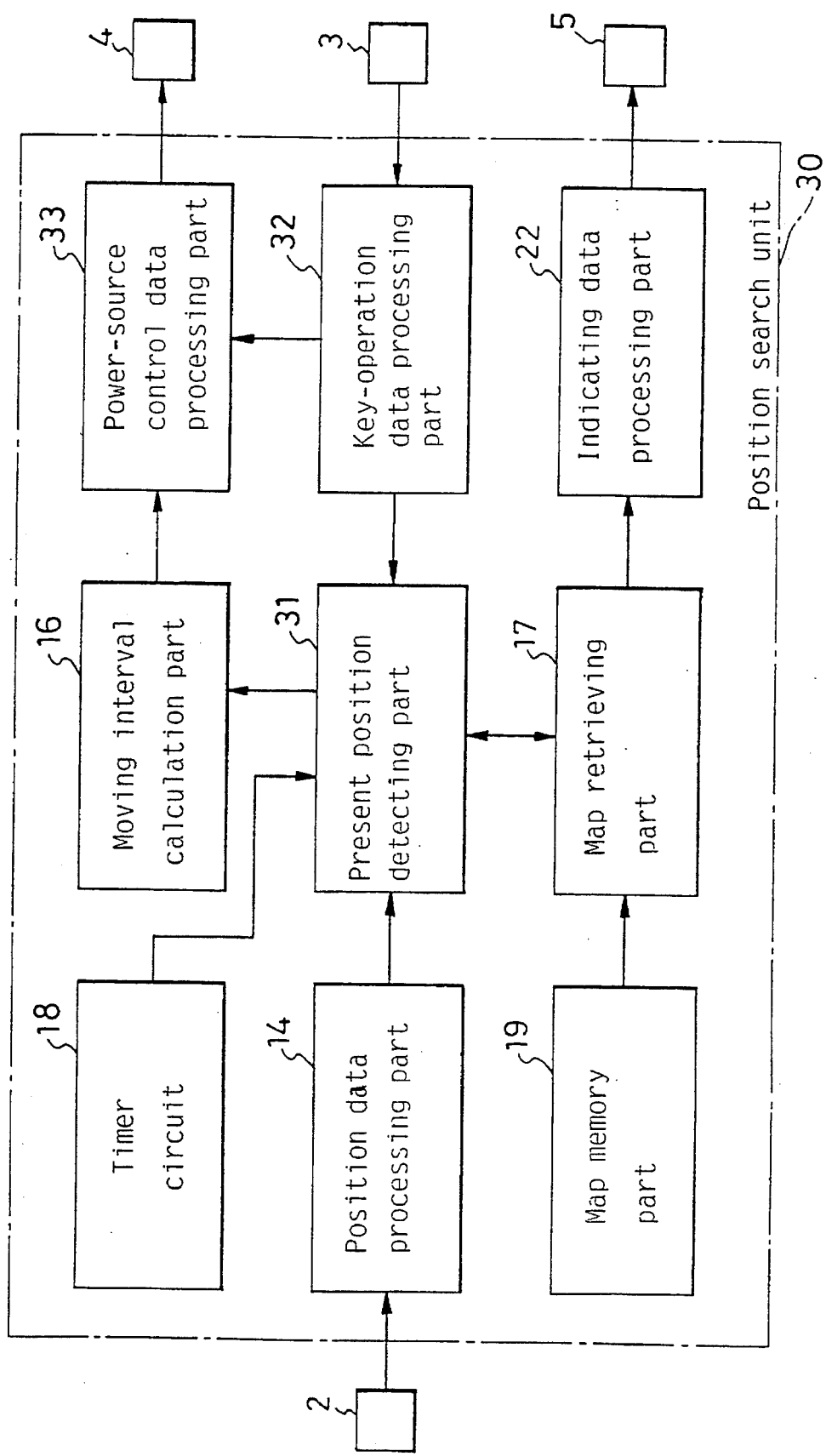
FIG. 4 is a block diagram showing a second embodiment of a positioning apparatus in accordance with the present invention.
Figure 5:
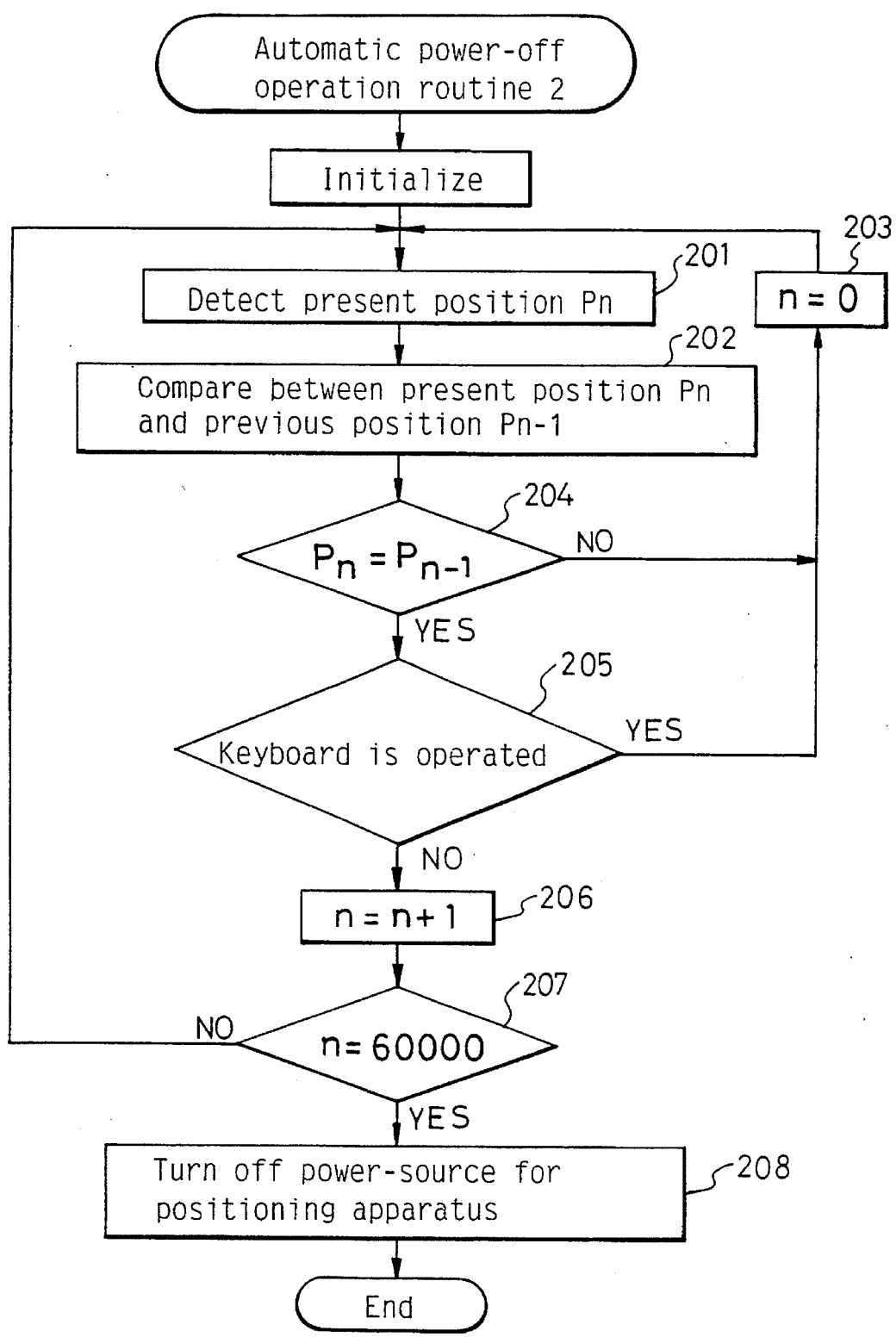
FIG. 5 is a flowchart showing the operation of the positioning apparatus of FIG. 4.

Hereafter, a second embodiment of a positioning apparatus in accordance with the present invention is elucidated with reference to FIG. 4 and FIG. 5.

FIG. 4 shows a block diagram of a position search unit 30 in the positioning apparatus of the second embodiment. FIG. 5 shows a flowchart of an operation of the positioning apparatus of the second embodiment. Corresponding parts and components to the first embodiment are shown by the same numerals and marks, and the description thereof made in the first embodiment similarly apply. Differences and features of this second embodiment from the first embodiment are as follows.

In FIG. 4, the positioning apparatus comprises a GPS (global positioning system) unit 2 as a position detecting means for receiving and analyzing radio waves from an artificial earth satellites. A keyboard unit 3 is provided as a data input means for operating the position search apparatus. A power-source supply unit 4 supplies power to the positioning apparatus. A display unit 5 provides information about position data etc. A position search unit 30 computes the present position of the vehicle having the positioning apparatus. The position search unit 30 controls the power-source supply to the positioning apparatus. The position search unit 30 includes a position data processing part 14 for computing a latitude and a longitude from detected position data of the GPS unit 2. The position search unit 30 has a present position detecting part 31 for detecting a present position of the vehicle from the computed position data of the position data processing part 14.

The data about the detected present position and map information corresponding to the detected present position are fed to an indicating data processing part 22 through a map retrieving part 17 connecting a map memory part 19. A moving interval calculation part 16 is provided for calculating a moving interval of the vehicle by using the data about the detected present position and the stored previous position of the vehicle.

Furthermore, the position search unit 30 provides a power-source control data processing part 33 for outputting control signals to the power-source supply unit 4, a key-operation data processing part 32 for connecting control signals from the keyboard unit 3 to the position search unit 30, and a timer circuit 18 for counting operations in the position search unit 30. The position search unit 30 is constituted substantially by an A/D converter, an arithmetic unit, such as a logical circuit having a CPU, a CD-ROM and so on.

The position data processing part 14 computes a position data by using the analyzed radio waves of the GPS unit 2. The present position detecting part 31 computes the present position of the vehicle from the position data, which is computed by the position data processing part 14. The moving interval calculation part 16 computes a moving interval between the detected present position and the stored previous position Just before this detecting time.

The above-mentioned position search unit 30 of the second embodiment performs the following automatic power-source shutoff operation (hereinafter abbreviated as automatic power-off operation) by using the position data detected in the position search unit 30.

FIG. 5 shows a flowchart of the automatic power-off operation of the positioning apparatus of the second embodiment. The position search unit 30 of the positioning apparatus performs periodically the following automatic power-off operation routine every 20 msec in this embodiment.

In step 201 of FIG. 5, the present position Pn of the vehicle is detected by using position data of the position data processing part 14. In step 202, the detected present position Pn is compared with the previous position Pn−1 just before this routine. In step 204, it is judged whether the detected present position Pn is almost the same as the previous position Pn−1 or not. Because the computed vehicle's position includes some error owing to measurement etc., the position data to be compared is designed to have some allowable margin.

When the position search unit 30 in step 204 decides "YES", that is, the vehicle is in stopping state, the sequence goes to step 205. In step 205, it is detected whether the keyboard is operated in this time-interval or not. When the keyboard is not operated, a time counter of the timer circuit 18 adds "1" to the stored ordinal number n in step 206. Next, in step 207, it is judged whether the new ordinal number n comes to the predetermined ordinal number, such as 60000 (corresponding to 20 minutes), or not. When the new ordinal number n comes to 60000, the power-source supply for each unit in the positioning apparatus is shut off in step 208 by the power-source supply unit 4, and then the automatic power-off operation routine is finished.

In step 204, when the position search unit 30 decides "NO", that is, the vehicle is in a moving state, the counted ordinal number n is reset at "0" in step 203, and the sequence returns to step 201. In step 205, when the position search unit 30 decides "YES", the sequence returns to step 201 after the ordinal number n is reset at "0" in step 203.

In step 207, the ordinal number n does not come to predetermined ordinal number (60000), that is, the stoppage time of the vehicle is not over than a predetermined time-interval (20 minutes), the sequence returns to step 201 as shown in FIG. 5.

As mentioned above, the automatic power-off operation routine is performed by the position search unit 30 every 20 msec during ON state of the positioning apparatus. The power-source supply to the positioning apparatus is shut off by the power-source supply unit 4 when the vehicle has been in a stopping state for a predetermined time-interval (20 minutes) without operation of the keyboard for the predetermined time-interval (20 minutes). After which, the automatic power-off operation routine of the second embodiment is finished.

The power-source for the positioning apparatus of the second embodiment can be controlled to be supply or to be shut off by operating the keyboard unit as a matter of course.

According to the second embodiment of the present invention, when the vehicle provided with the positioning apparatus is moving, that is, the detected present position of the vehicle is changing, power is supplied to any unit of the positioning apparatus as long as the power-source is not shut off by a key-operation. And further, when the keyboard of the keyboard unit 3 is operated by an operator, such as, a driver, the power-source is not turned off on any unit of the positioning apparatus. When the vehicle has been stopped for a predetermined time-interval (such as 20 minutes) without operation of the keyboard for the predetermined time-interval (such as 20 minutes), the power-source supply is shut off to each unit of the position search unit 30.

Apart from the above-mentioned embodiment wherein the power-source supply unit 4 controls the power-source for each unit of the positioning apparatus, a modified embodiment may be such that a power-source supply unit controls a power-source for only display unit.

THIRD EMBODIMENT

Figure 6:
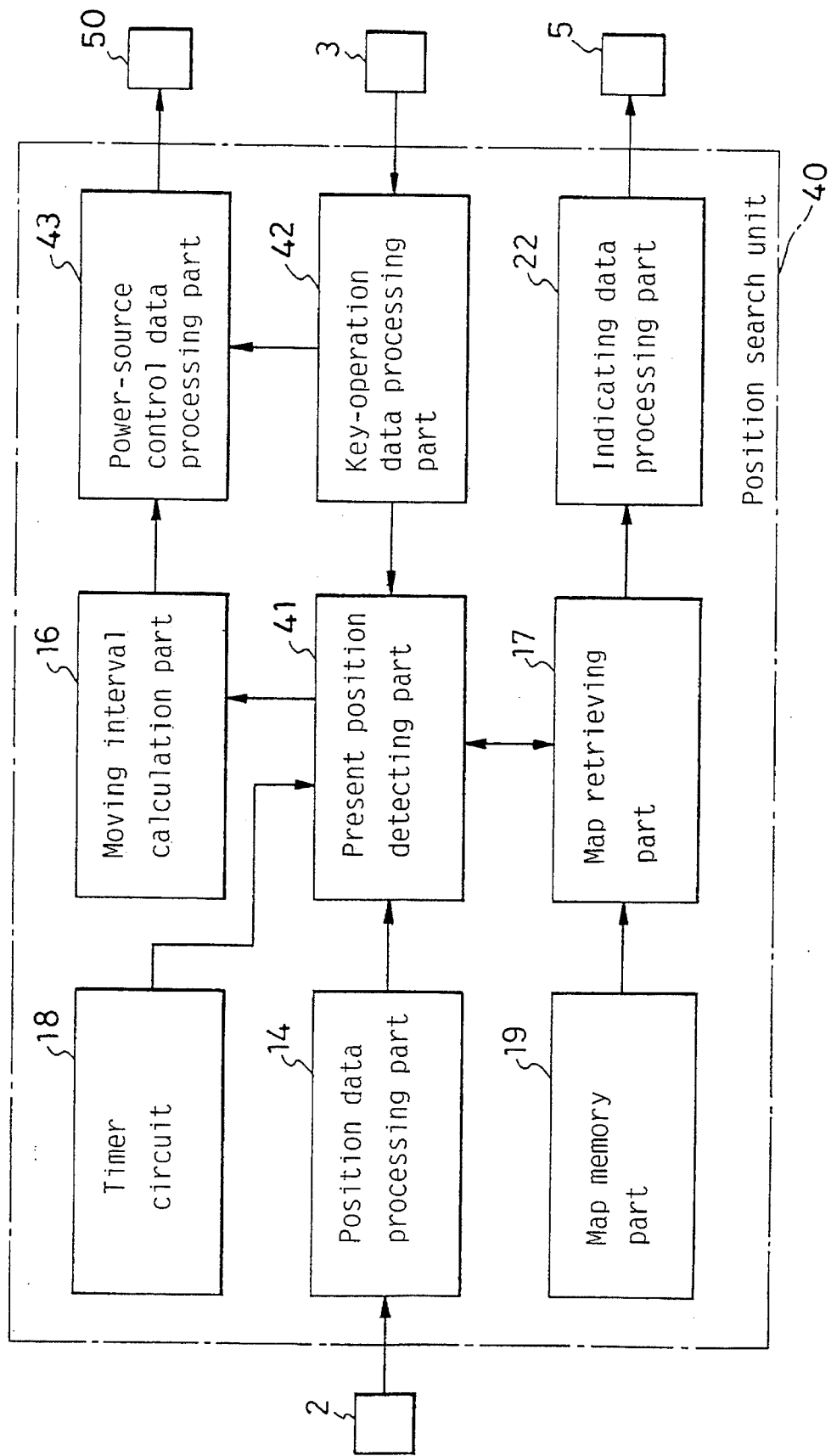
FIG. 6 is a block diagram showing a third embodiment of a positioning apparatus in accordance with the present invention.
Figure 7:
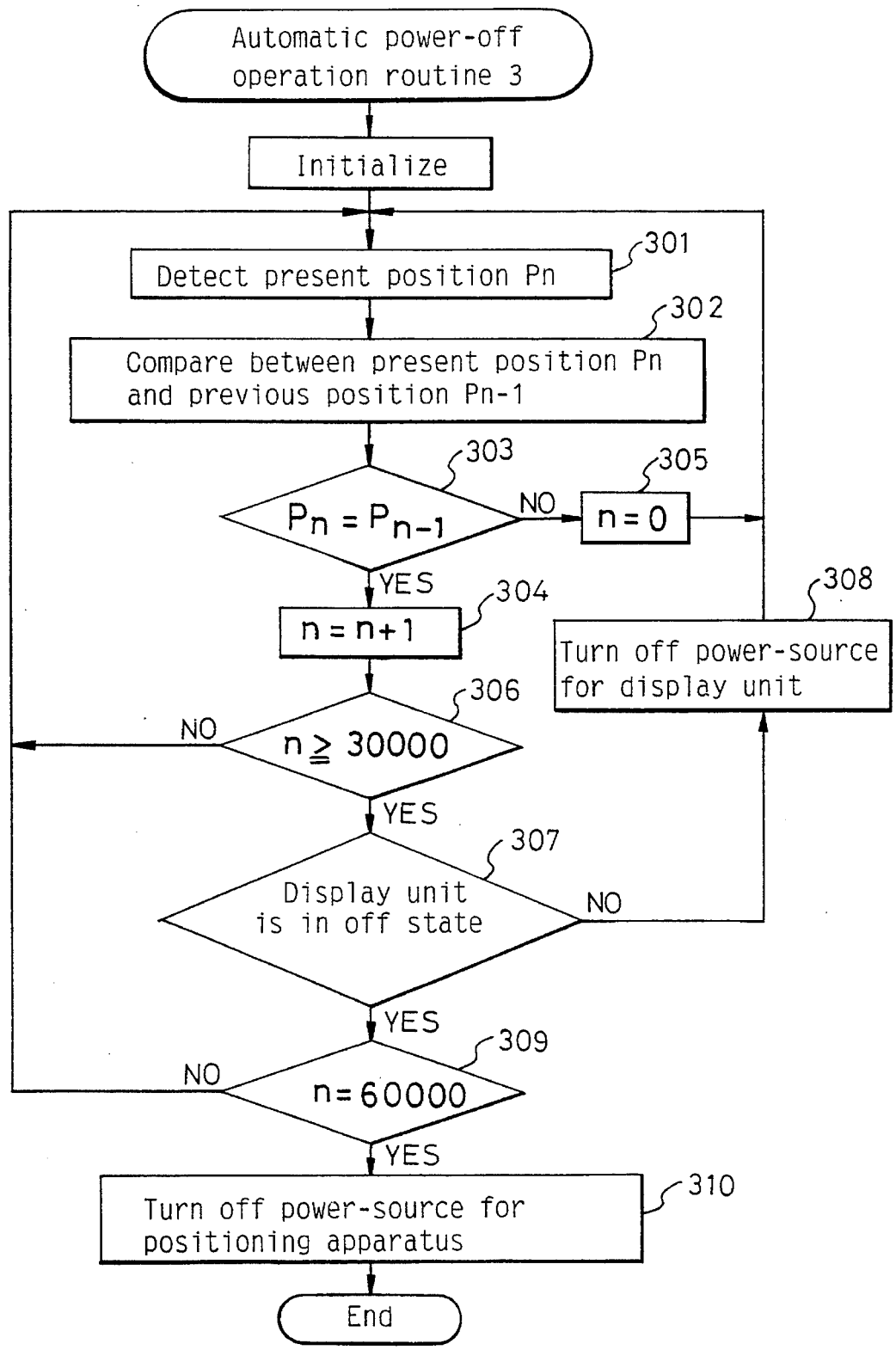
FIG. 7 is a flowchart showing the operation of the positioning apparatus of FIG. 6.

Hereafter, a third embodiment of a positioning apparatus in accordance with the present invention is elucidated with reference to FIG. 6 and FIG. 7.

FIG. 6 shows a block diagram of a position search unit 40 in the positioning apparatus of the third embodiment. FIG. 7 shows a flowchart of an operation of the positioning apparatus of the third embodiment. Corresponding parts and components to the first embodiment are shown by the same numerals and marks, and the description thereon made in the first embodiment similarly apply. Differences and features of this third embodiment from the first embodiment are as follows.

In FIG. 6, the position search unit 40 of the positioning apparatus includes a position data processing part 14 which computes position data about latitude and longitude from detected position data of a GPS unit 2. The computed position data of the vehicle is fed to a present position detecting part 41, and the present position detecting part 41 detects the present position of the vehicle from the computed position data.

The position search unit 40 provides a key-operation data processing part 42 for receiving control signals from a keyboard unit 3. A power-source control data processing part 43 selectively controls the power supply to each unit through a power-source supply unit 50. The power-source control data processing part 43 is for selecting a unit to which the power-source supply is stopped by the power-source supply unit 50. The selection is performed by operating the keyboard unit 3, and connected to the present position detecting part 41 through the key-operation data processing part 42. The position search unit 40 is constituted substantially by an A/D converter, an arithmetic unit, such as a logical circuit having a CPU, a CD-ROM and so on.

The position data processing part 14 computes position data by using the analyzed radio waves of the GPS unit 2. The present position detecting part 41 computes the present position of the vehicle from the position data which is computed by the position data processing part 14. The moving interval calculation part 16 computes a moving interval between the detected present position and the stored previous position just before this detection time.

The above-mentioned position search unit 40 of the third embodiment performs the following automatic power-source shutoff operation (hereinafter abbreviated as automatic power-off operation) by using the position data detected in the position search unit 40.

FIG. 7 shows a flowchart of the automatic power-off operation of the positioning apparatus of the third embodiment. The position search unit 40 of this positioning apparatus periodically performs the following automatic power-off operation routine every 20 msec in this embodiment.

In step 301 of FIG. 7, the present position Pn of the vehicle is detected by using position data of the position data processing part 14. In step 302, the detected present position Pn is compared with the previous position Pn−1 just before this routine. In step 303, it is judged whether the detected present position Pn is almost the same as the previous position Pn−1 or not. Since the computed vehicle's position includes some error owing to measurement etc., the position data to be compared is designed to have some allowable margin.

When the position search unit 40 in step 303 decides "YES", that is, the vehicle is in a stopping state, a time counter of the timer circuit 18 adds "1" to a stored ordinal number n in step 304. Next, in step 306, it is judged whether the new ordinal number n comes to a predetermined ordinal number, such as 30000 (corresponding to 10 minutes), or not. When the new ordinal number n comes to 30000, the sequence goes to step 307. In step 307, it is judged whether the selected unit, such as display unit 5, is in OFF state or not. When the display unit 5 is in ON state, the power-source for the display unit 5 is turned off by the power-source supply unit 50 in step 308, and the sequence returns to step 301.

When the display unit 5 is in OFF state, it is judged in step 309 whether the counted ordinal number n comes to a predetermined ordinal number, such as 60000 (corresponding to 20 minutes), or not. When the counted ordinal number n comes to 60000, a shutoff order signal for shutting off the power-source for each unit of the positioning apparatus is fed to the power-source supply unit 50 through the power-source control data processing part 43 in step 310.

In step 303, when position search unit 40 decides "NO", that is the vehicle is in a moving state, the counted ordinal number n is reset at "0"in step 305, and the sequence returns to step 301. In step 306, when the counted ordinal number n does not come to 30000, the sequence returns to step 301.

In step 309, when the position search unit 40 decides "NO", that is, the stoppage time-interval of the vehicle does not come to the predetermined time-interval (20 minutes), the sequence goes to step 301. In the above-mentioned state, only display unit 5 is changed to the OFF state and the other units are kept in the ON state. Because the GPS unit 2 is operating to detect a present position of the vehicle in this state, the detected present position of the vehicle is instantaneously indicated on the display by operating the keyboard. For example, in a positioning apparatus using a CPU of 16 bit as the arithmetic unit, the operation time for indicating the present position takes about 0.1 msec in the above-mentioned state, that is, when the only display unit 5 is not operated. If the power-source for the whole units is stopped to supply to the positioning apparatus, the above-mentioned operation time takes about 15 sec. Therefore, the positioning apparatus of the third embodiment is designed to the save energy of the battery, and besides, is useful as a navigation system.

As mentioned above, the automatic power-off operation routine is performed in the position search unit 40 every 20 msec, and the power-source supply to the positioning apparatus is shut off by the power-source supply unit 50 when the vehicle is in a stopping state for a predetermined time-interval. After which, the automatic power-off operation routine is finished.

The power-source for the positioning apparatus of the third embodiment can be controlled to be supplied or to be shut off by operating keyboard unit 3 as a matter of course.

According to the third embodiment of the present invention, when the vehicle loading the positioning apparatus is moving, that is, the detected present position of the vehicle is changing, the power-source is never stopped to be supplied to any unit of the positioning apparatus as long as the power-source is shut off by a key-operation. When the vehicle has been stopped for a predetermined first time-interval (10 minutes), the power-source is stopped to be supplied to the selected unit in the positioning apparatus. Furthermore, when the vehicle has been stopped for a predetermined second time-interval (20 minutes) longer than the predetermined first time-interval, the power-source is stopped to be supplied to the whole unit of the positioning apparatus.

FOURTH EMBODIMENT

Figure 8:
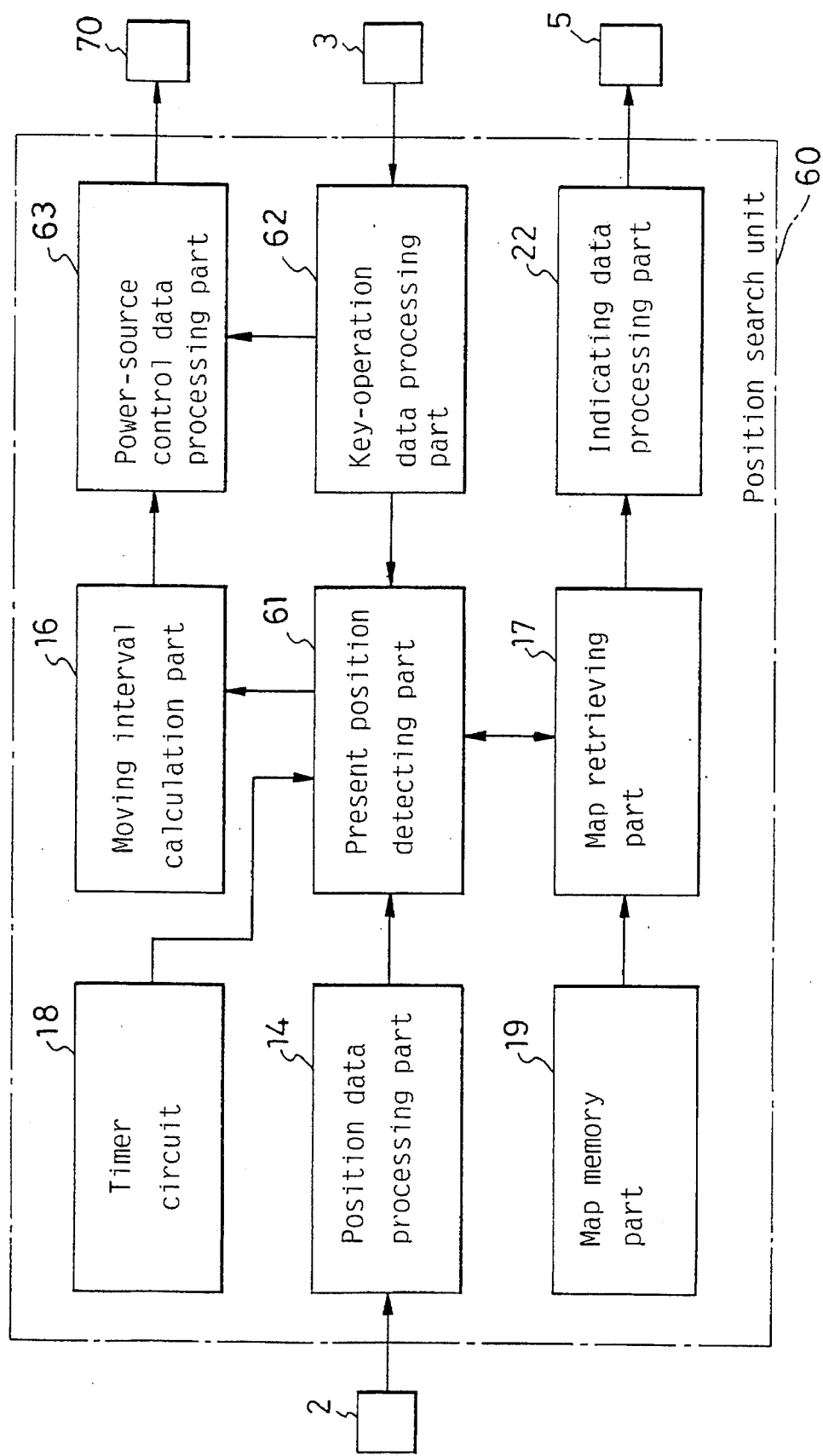
FIG. 8 is a block diagram showing a fourth embodiment of a positioning apparatus in accordance with the present invention.
Figure 9:
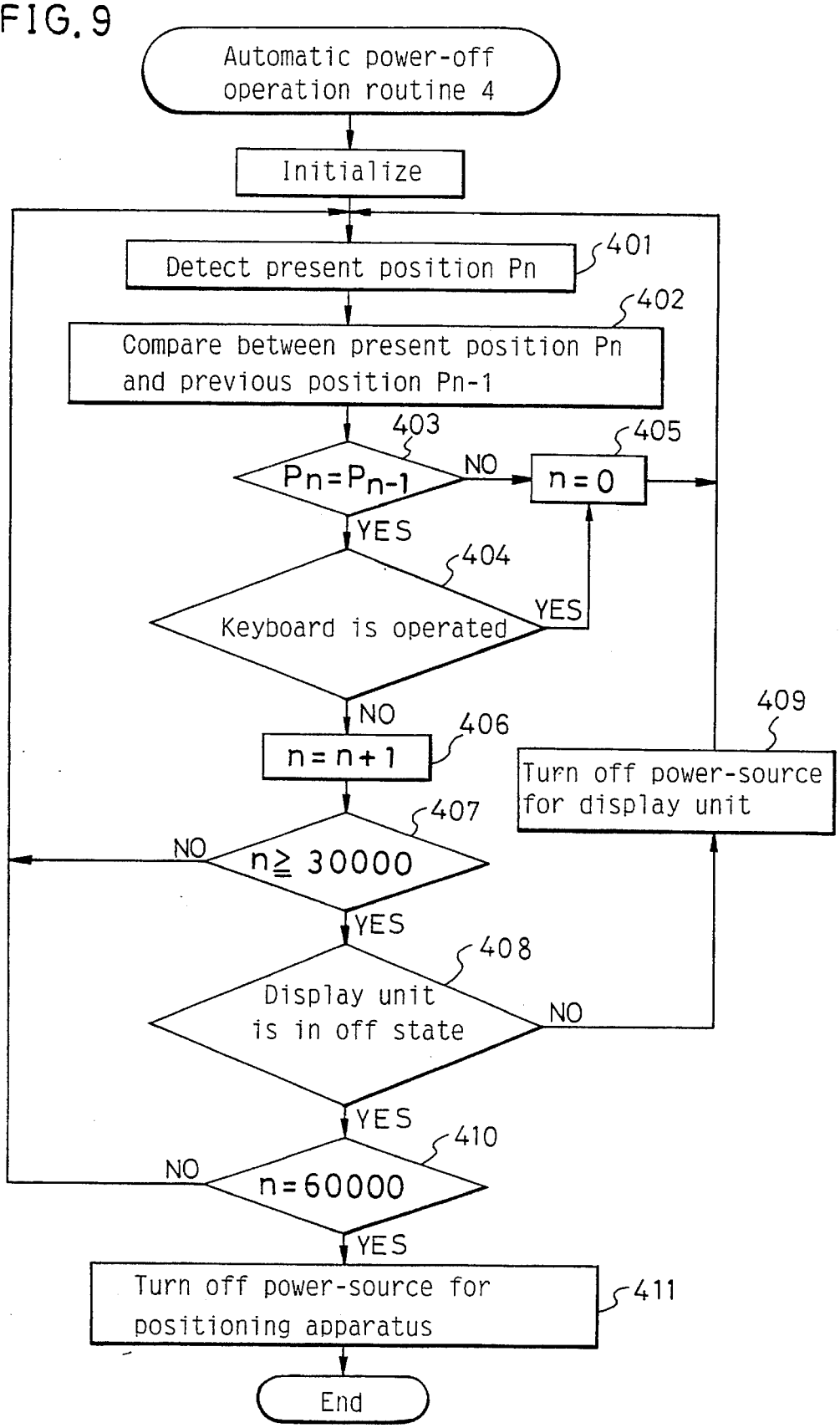
FIG. 9 is a flowchart showing the operation of the positioning apparatus of FIG. 8.

Hereafter, a fourth embodiment of a positioning apparatus in accordance with the present invention is elucidated with reference to FIG. 8 and FIG. 9.

FIG. 8 shows a block diagram of a position search unit 60 in the positioning apparatus of the fourth embodiment. FIG. 9 shows a flowchart of an operation of the positioning apparatus of the fourth embodiment. Corresponding parts and components to the first embodiment are shown by the same numerals and marks, and the description thereon made in the first embodiment similarly apply. Differences and features of this fourth embodiment from the first embodiment are as follows.

In FIG. 8, the position search unit 60 of the positioning apparatus has a position data processing part 14 which computes position data about latitude and longitude from position data detected by a GPS unit 2. The computed position data of the vehicle is fed to a present position detecting part 61, and the present position detecting part 61 detects the present position of the vehicle from the computed position data.

The position search unit 60 provides a key-operation data processing part 62 for receiving control signals from a keyboard unit 3. A power-source control data processing part 63 selectively controls the power supply to each unit through a power-source supply unit 70. The key-operation data processing part 62 is provided to receive data from the keyboard unit 3, and to detect whether the keyboard is operated or not. The power-source control data processing part 63 is for selecting a unit to which the power-source supply is stopped by the power-source supply unit 70. The selection is performed by operating the keyboard unit 3, and connected to the present position detecting part 61 through the key-operation data processing part 62. The position search unit 60 is constituted substantially by an A/D converter, an arithmetic unit, such as a logical circuit having a CPU, a CD-ROM and so on.

The position data processing part 14 computes position data by using the analyzed radio waves of the GPS unit 2. The present position detecting part 61 computes the present position of the vehicle from the position data which is computed by the position data processing part 14. The moving interval calculation part 16 computes a moving interval between the detected present position and the stored previous position just before this detecting time.

The above-mentioned position search unit 60 of the fourth embodiment performs the following automatic power-source shutoff operation (hereinafter abbreviated as automatic power-off operation) by using the position data detected in the position search unit 60.

FIG. 9 shows a flowchart of the automatic power-off operation of the position search unit 60 of the fourth embodiment. In this embodiment, the position search unit 60 of the positioning apparatus periodically performs the following automatic power-off operation routine every 20 msec.

In step 401 of FIG. 9, the present position Pn of the vehicle is detected by using position data of the position data processing part 14. In step 402, the detected present position Pn is compared with the previous position Pn–1 just before this routine. In step 403, it is judged whether the detected present position Pn is almost the same as the previous position Pn–1 or not. Because the computed vehicle's position includes some error owing to measurement etc., the position data to be compared is designed to have some allowable margin.

When the position search unit 60 in step 403 decides "YES", that is, the vehicle is in a stopping state, the sequence goes to step 404. In step 404, it is judged whether the keyboard is operated in this time-interval or not. When the keyboard is not operated, a time counter of the timer circuit 18 adds "1" to the stored ordinal number n in step 406. Next, in step 407, it is judged whether the new ordinal number n comes to a predetermined ordinal number, such as 30000 (corresponding to 10 minutes), or not. When the new ordinal number n comes to 30000, the sequence goes to step 408. In step 408, it is judged whether the selected unit, such as display unit 5, is in OFF state or not. When the display unit 5 is in ON state, the power-source for the display unit 5 is turned off by the power-source supply unit 70 in step 409, and the sequence returns to step 401.

When the display unit 5 is in OFF state, it is judged in step 410 whether the counted ordinal number n comes to a predetermined numeral, such as 60000 (corresponding to 20 minutes), or not. When the counted ordinal number n comes to 60000, a shutoff order signal for shutting off the power-source for the whole unit of the positioning apparatus is fed to the power-source supply unit 70 through the power-source control data processing part 63 in step 411.

In step 403, when the position search unit 60 decides "NO", that is, the vehicle is in a moving state, the stored ordinal number n is reset at "0" in step 405, and the sequence returns to step 401. In step 404, when the position search unit 60 decides "YES", the stored ordinal number n is reset at "0" in step 405, and the sequence goes to step 401.

In step 407, when the position search unit 60 decides "NO", that is, the vehicle is in a stopping state for a predetermined first time-interval (10 minutes) without operation of the keyboard for the predetermined first time-interval (10 minutes), the sequence returns to step 401.

In step 410, when the position search unit 60 decides "NO", that is, the vehicle is in a stopping state for a predetermined second time-interval (20 minutes) without operation of the keyboard for the predetermined second time-interval (20 minutes), the sequence returns to step 401. In the above-mentioned state, the only display unit 5 is changed to the OFF state and the other units are kept in the ON state. Because the GPS unit 2 is operating to detect a present position of the vehicle in this state, the detected present position of the vehicle is instantaneously indicated on the display by operating the keyboard.

As mentioned above, the automatic power-off operation routine is performed in the position search unit 60 every 20 msec, and the power-source supply to the positioning apparatus is shut off by the power-source supply unit 70 when the vehicle is in a stopping state for the predetermined second time-interval (20 minutes) without operation of the keyboard for the predetermined second time-interval. After which, the automatic power-off routine is finished. The power-source for the positioning apparatus of the fourth embodiment can be controlled to be supplied or to be shut off by operating keyboard unit 3 as a matter of course.

According to the fourth embodiment of the present invention, when the vehicle provided with the positioning apparatus is moving, that is, the detected present position of the vehicle is changing, the power-source is not turned off on any unit of the positioning apparatus as long as the power-source is shut off by a key-operation. When the vehicle has been stopped for the predetermined first time-interval (10 minutes) without operation of the keyboard for the predetermined first time-interval, the power-source is turned off on the selected unit, for example display unit. Furthermore, when the vehicle has been stopped for the predetermined second time-interval (20 minutes) without operation of the keyboard for the predetermined second time-interval, the power-source is stopped to be supplied to the whole units of the positioning apparatus.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A positioning apparatus comprising:

a position detecting means in a vehicle for providing information indicative of a current position of said vehicle;

a power-source supply means for providing power to at least one component of said positioning apparatus;

a display means for indicating position data of said vehicle based on said information output from said position detecting means;

a position search means for computing a present position of said vehicle based on said information provided by said position detecting means and for outputting a control signal to shut off said power-source supply means if said vehicle is in a stopping state for a predetermined time-interval as determined by comparing said present position with a previously detected present position.

2. A positioning apparatus comprising:

a position detecting means in a vehicle for providing information indicative of a current position of said vehicle;

a data input means for inputting control data for said positioning apparatus;

a power-source supply means for providing power to at least one component of said positioning apparatus;

a display means for indicating position data of said vehicle based on said information output from said position detecting means; and a position search means for computing a present position of said vehicle based on said information provided by said position detecting means and for outputting a control signal to shut off said power-source supply means if said vehicle is in a stopping state for a predetermined time-interval as determined by comparing said present position with a previously detected present position without operation of said data input means for said predetermined time-interval.

3. A positioning apparatus comprising:

a position detecting means in a vehicle for providing information indicative of a current position of said vehicle;

a power-source supply means for providing power to each component in said positioning apparatus;

a display means for indicating position data of said vehicle based on said information output from said position detecting means;

a position search means for computing a present position of said vehicle based on said information provided by said position detecting means and for outputting a first control signal to shut off a supply of power from said power-source supply means to a selected component of said positioning apparatus if said vehicle is in a stopping state for a predetermined first time-interval as determined by comparing said present position with a previously detected present position and further for outputting a second control signal to shut off said power-source supply means for said positioning apparatus when said vehicle is in a stopping state for a predetermined second time-interval that is longer than said predetermined first time-interval.

4. A positioning apparatus comprising:

a position detecting means in a vehicle for providing information indicative of a current position of said vehicle;

a data input means for inputting control data for said positioning apparatus and for selecting a component of said positioning apparatus to be shut off;

a power-source supply means for providing power to each component in said positioning apparatus;

a display means for indicating position data of said vehicle based on said information output from said position detecting means;

a position search means for computing a present position of said vehicle based on said information provided by said position detecting means and for outputting a first control signal to shut off a supply of power from said power-source supply means to said component selected by said data input means if said vehicle is in a stopping state for a predetermined first time-interval as determined by comparing said present position with a previously detected present position and if said data input means is not operated for said predetermined first time-interval and further for outputting a second control signal to shut off said power-source supply means for said positioning apparatus if said vehicle is in a stopping state for a determined second time-interval without operation of said data input means for said predetermined second time-interval, said predetermined second time-interval being longer than said predetermined first time-interval.

5. A positioning apparatus in accordance with claim 1, 2, 3 or 4, wherein said position detecting means detects said present position by using radio waves from an artificial earth satellite.

6. A positioning apparatus in accordance with claim 1, 2, 3 or 4, wherein said position search means includes a map memory part for storing map information and a retrieving part for retrieving said map information from said map memory part.

* * * * *